(12) United States Patent
Iles et al.

(10) Patent No.: US 7,000,399 B2
(45) Date of Patent: Feb. 21, 2006

(54) SYSTEM FOR WARMING PRESSURIZED GAS

(75) Inventors: Thomas L. Iles, Rancho Palos Verdes, CA (US); Michael S. Koerner, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 190 days.

(21) Appl. No.: 10/754,230

(22) Filed: Jan. 8, 2004

(65) Prior Publication Data

US 2005/0034462 A1 Feb. 17, 2005

Related U.S. Application Data

(62) Division of application No. 09/516,877, filed on Mar. 1, 2000, now Pat. No. 6,658,855.

(51) Int. Cl.
*F02C 7/08* (2006.01)

(52) U.S. Cl. .............................. 60/772; 60/727; 60/787; 165/179

(58) Field of Classification Search ................. 165/179; 60/772, 727, 730, 257–260, 787; 137/208, 137/571, 264, 335, 340; 220/585, 560.1, 220/506; 62/48.4, 50.3, 48.1, 50.2, 7
See application file for complete search history.

(56) References Cited

U.S. PATENT DOCUMENTS

| | | | | | |
|---|---|---|---|---|---|
| 1,363,313 | A | * | 12/1920 | Conover | 62/48.4 |
| 1,951,758 | A | * | 3/1934 | Jones | 62/48.1 |
| 2,035,396 | A | * | 3/1936 | Mesinger | 62/50.2 |
| 2,244,800 | A | * | 6/1941 | Pascale | 165/179 |
| 2,293,263 | A | * | 8/1942 | Kornemann et al. | 62/48.1 |
| 2,467,668 | A | * | 4/1949 | Hallberg | 165/179 |
| 3,366,107 | A | * | 1/1968 | Frantom | 62/48.1 |
| 4,048,290 | A | * | 9/1977 | Lee | 423/336 |
| 4,601,175 | A | * | 7/1986 | Kneip et al. | 62/50.2 |
| 4,777,793 | A | | 10/1988 | Weigand et al. | |
| 4,934,136 | A | | 6/1990 | Weigand et al. | |
| 4,965,995 | A | | 10/1990 | Vershure, Jr. et al. | |
| 4,979,362 | A | | 12/1990 | Vershure, Jr. | |
| 5,070,689 | A | | 12/1991 | Vershure, Jr. et al. | |
| 5,097,659 | A | | 3/1992 | Lampe et al. | |
| 5,136,838 | A | | 8/1992 | Shekleton et al. | |
| 5,365,902 | A | * | 11/1994 | Hsu | 123/299 |
| 6,658,855 | B1 | * | 12/2003 | Iles et al. | 60/727 |

* cited by examiner

*Primary Examiner*—Ted Kim
(74) *Attorney, Agent, or Firm*—Oral Caglar, Esq.

(57) ABSTRACT

A plurality of vessels contains pressurized gas. Each vessel fluidly communicates with an adjacent vessel through a line. A heat exchanger is positioned in a heat conducting relationship with each line. The system includes an exhaust valve communicating with lower pressure. In one embodiment, the vessels communicate in series and only one of the vessels communicates with the exhaust valve. Alternatively, the vessels are arranged in a loop configuration with two of the vessels communicating with the exhaust valve through respective lines each containing a shutoff valve. The two shutoff valves are opened and closed in concert to cause the flow in the system to alternate directions as it is being exhausted. In a third configuration, two vessels communicate through a singular line in accordance with the most basic embodiment, but the vessel communicating with the exhaust valve encloses the other vessel. Heat transfer fins are located in the enclosed vessel, and extend into the enclosing vessel. A heat exchanger is located in a heat conducting relationship with the communicating line to heat the gas flowing from the enclosed vessel, and the fins conduct part of this heat to the gas still inside the enclosed vessel.

13 Claims, 3 Drawing Sheets

SYSTEM FOR WARMING PRESSURIZED GAS

This is a divisional application of U.S. application Ser. No. 09/516,877, filed Mar. 1, 2000, now U.S. Pat. No. 6,658,855.

BACKGROUND OF THE INVENTION

The present invention relates to warming pressurized gas contained in storage vessels while the gas is being exhausted to lower pressure and, more particularly, using a series of fluidly communicating vessels having heat sources located in between them to warm the gas as it is flowing through the storage system while the system is being vented to lower pressure.

The flight control systems of modern aircraft use a flight control computer to generate command signals after interpreting and analyzing inputs from the pilot's controls, air data sensors and other aircraft systems. The position of aerodynamic control surfaces, the configuration of engine nozzles and inlets, and engine fuel controls are adjusted responsive to the command signals. The foregoing adjustments are usually made using electric or hydraulic actuators. Such computer-controlled systems are commonly referred to as "fly-by-wire" systems.

Fly-by-wire systems offer significant advantages over non-computerized systems. The flight control computer can assist the pilot by continuously monitoring and adjusting the aircraft's control surfaces to compensate for changed flight parameters, for example, changes in airspeed. It can also use the inputs from the pilot's controls together with current aircraft flight conditions to provide optimum performance while ensuring that the aircraft remains within its permissible flight envelope. For example, if the pilot pulls back hard on the control stick, the computer will command the control surfaces to a maximum "g" pull-up for the current airspeed and altitude.

In conjunction with military aircraft, the flight control computer can be integrated with offensive or defensive systems to optimally position the aircraft for weapon deployment, or to maneuver away from threats most effectively. In addition, fly-by-wire systems can be used to augment the stability of aircraft that have compromised their stability to obtain a stealthier shape or increased performance, or have had their stability reduced due to damage. Such stability augmentation may require continuously dithering the control surfaces. In each of these cases the computational capability and rapid reaction rate of the fly-by-wire control system allows the pilot to maintain the aircraft in dynamically stable flight and to safely maneuver it, whereas the numerous sensory inputs and split-second response times would probably overwhelm a human pilot acting without such assistance.

It is essential that modern military aircraft have uninterrupted electrical and hydraulic power to operate their fly by wire control systems, as it can take mere seconds without a correction for such an aircraft to become uncontrollable. It is therefore imperative for such aircraft to have a backup system to supply electrical and hydraulic power almost instantaneously in the event of the failure of the primary power systems. The backup system is designed to provide emergency power for a relatively short period, e.g., from one to ten minutes. It is intended to provide the pilot with the opportunity either to remedy the problem with the primary electrical system, to land the aircraft, or to properly orient the aircraft to enable him and any other occupants to safely eject from the aircraft.

The emergency power system uses a turbine to drive an electrical alternator or generator, and a hydraulic pump. The turbine wheel is rotated by expanding gases produced by combustion of a mixture of fuel and oxygen in a combustor. The combustion must occur reliably at even the highest operating altitude, where the oxygen content of the air is quite low. Accordingly, to ensure the availability of emergency electrical power throughout the flight envelope, the oxygen for the combustor is stored on board in a pressurized vessel containing oxygen, air or oxygen-enriched air.

As the stored gas is exhausted into a lower pressure downstream of the exhaust valve of the pressurized vessel, its temperature decreases as it expands in accordance with the Joule-Thompson effect. Moreover, the temperature of the gas remaining in the vessel also decreases as the result of the polytropic expansion of the contained gas. Due to the foregoing, the total temperature drop in the exhausted gas can be significant if the ratio between the initial stored gas pressure and the final stored gas pressure is large and if discharge occurs quickly. For example, a temperature drop of approximately 100° F. has been observed during a two minute discharge from an initial stored gas pressure of 5000 psi to a final stored gas pressure of 1500 psi.

The cooling of the gas is undesirable for several reasons. The low temperature inside the storage vessel increases the density of the gas therein. This proportionally increases the mass of gas remaining in the vessel when the vessel pressure becomes approximately equal to the downstream exhaust pressure and the gas no longer flows out of the vessel. The mass of unusable gas remaining in the vessel thus increases as the temperature decreases. The necessary quantity of useable gas could nonetheless be stored by simply increasing the number or size of the vessels. However, the weight and the space that would be necessary to store additional vessels of pressurized gas are at a premium.

Moreover, the exhaust valve or downstream flow control valve used to meter and control the exhaust flow from the vessel is intricate and has critical moving components with tight clearances. A lower temperature extreme causes greater contraction of these components, proportionally increasing the overall differential between their dimensions at the high temperature extreme occurring before exhaust, and the low temperature extreme which occurs towards the end of the exhaust interval. This makes the valve's design and manufacture more difficult and expensive.

Furthermore, low temperatures give rise to the possibility that ice will be formed from vapor carried in the gas stored in the vessel, and that this ice will clog the exhaust valve. Extremely low temperatures require the use of special dehumidifying equipment to ensure that the vessels are filled with gas that is extremely dry, so as to prevent the formation of ice. This support equipment, together with the time and labor necessary to properly use it, adds to the overall cost of the emergency power system.

However, regardless of the care and cost involved in the designing and manufacturing exhaust valves to strict tolerances, and attendant to filling the pressurized vessel with gas of extremely low humidity, decreasing the low temperature extreme of the gas inside the vessel inevitably increases the probability that the exhaust valve will bind or suffer a metering error. Decreasing the low temperature extreme thus adversely affects the reliability of a component whose performance, when called upon, will directly affect the likelihood that the pilot will successfully regain primary power, land the aircraft, or safely eject from a properly oriented aircraft.

A decreased low temperature extreme also causes the system's elastomeric seals to become more rigid. This adversely affects their sealing qualities and increases the probability of leakage. As a leak would decrease the mass of pressurized gas available for generating emergency power, the increased probability of leakage occasioned by less elastic seals further degrades the reliability of the backup emergency power system.

In addition, to efficiently burn, the liquid fuel must first atomize, then vaporize. As the temperature of the gas mixing with the atomized fuel decreases, the vaporization of the fuel becomes inhibited. When the gas temperature is sufficiently cold, the fuel will not vaporize and, in an extreme case, may even freeze. Either of the foregoing would prevent or delay the ignition of the fuel, and adversely affect the performance of the turbine.

One solution to the problems outlined herein comprises igniting an incendiary device located inside the vessel to increase the temperature and pressure therein. More particularly, U.S. Pat. No. 4,965,995 and its divisional patent, U.S. Pat. No. 5,070,689, disclose positioning an incendiary device inside the pressurized vessel and a pressure sensor in the outlet of the vessel. When the pressure drops to a level that is insufficient to provide the desired flow rate of oxidant to the combustor, the incendiary device is ignited by the sensor. Alternatively or conjunctively, a temperature sensing probe may be located within the vessel to ignite the incendiary device when the temperature drops to a predetermined level. The ignition of the incendiary device raises the pressure within the vessel as a result of the explosion of the material of the device or from the heating of the oxidant within the vessel, or both.

One drawback to this approach is that it requires storing an incendiary device on board the aircraft, where accidental detonation from any one of several causes could injure personnel, damage the aircraft, or disable the emergency power system. For this reason, the use of incendiary devices onboard aircraft is avoided.

Furthermore, the incendiary device must contain a fuel and a quantity of oxidant such that after all of the fuel is reacted, the oxidant concentration within the vessel remains almost unchanged from its original concentration. In addition, the ignition of the incendiary device may cause the formation of particulate matter, such as carbon soot, as a by-product. Unless this possibility can be categorically disregarded, a filter must be positioned immediately upstream of the outlet to avoid clogging the flow control valve located downstream of the outlet.

Other approaches have heated the air or oxidant downstream of its exhaust from the pressurized vessel, and before its being mixed with the fuel. For example, U.S. Pat. No. 4,979,362 at column 4, lines 6–15, discloses a heat exchanger heating oxidant flowing from a pressurized vessel, then combining the heated oxidant with fuel and introducing the mixture into a combustor. U.S. Pat. Nos. 4,777,793 and 4,934,136, the latter being a division of the former, disclose mixing air coming directly from a high pressure tank with air which has been heated by a heat exchanger, then mixing this heated air with fuel and igniting the foregoing mixture in a combustor.

However, in heating the air or oxidant downstream of the exhaust valve of the pressurized vessel, the foregoing solutions ameliorate only the problem of fuel vaporization being inhibited by mixing the fuel with cold gas. Since the gas contained in the pressurized vessel remains unaffected, heating the downstream gas does not improve the expulsion efficiency for the gas remaining within the vessel. Furthermore, the foregoing approach fails to solve the problems of the hardening of the elastomeric seals and the contraction of the components of the vessel's exhaust valve.

As may be seen from the foregoing, there presently exists a need in the art for an apparatus which warms the gas used in an aircraft's emergency power system, while overcoming the shortcomings, disadvantages and limitations of the prior art. The present invention fulfills this need in the art.

SUMMARY OF THE INVENTION

A plurality of vessels contains pressurized air or some other oxidant. Each vessel fluidly communicates with an adjacent vessel through a line. Each line is located in a heat conducting relationship with a heat exchanger, respectively. The system includes an exhaust valve that fluidly communicates with one or more of the vessels.

When emergency power is needed, the exhaust valve is opened so that the pressurized system communicates with a lower downstream pressure. Gas flows from one vessel to another, and ultimately out of the system and into a combustor, where it is mixed with a fuel and burned. The expanding gases produced by the combustion rotate a turbine wheel which, in turn, powers an electric alternator or generator, and a hydraulic pump. As the gas in the system passes through each of the lines, it is warmed by heat conducted from the respective heat exchanger. This increases the temperature of the gas inside the system, as well as the gas flowing into the combustor.

In one embodiment of the present invention, the vessels communicate in series and only one of the vessels communicates with the exhaust valve. In a second embodiment, the vessels are arranged in a loop configuration so that the gas can alternately flow in opposing directions. More particularly, two of the vessels fluidly communicate with the exhaust valve through respective lines. Each line contains a shutoff valve. The two shutoff valves are opened and closed in concert to cause the flow in the system to alternate directions as it is being exhausted. This mixes the heated gas thoroughly throughout the system.

In a third configuration, two vessels communicate with each other through a singular line in accordance with the most basic embodiment of the present invention, but the vessel communicating with the exhaust valve encloses the other vessel. Heat transfer fins are located in the enclosed vessel, and extend into the enclosing vessel. A heat exchanger is situated in a heat conducting relationship with the communicating line to heat the gas flowing from the enclosed vessel into the enclosed vessel, and the fins conduct part of this heat to the gas still inside the enclosed vessel.

These and other features, aspects and advantages of the present invention will become better understood with reference to the following drawings, description and claims.

DETAILED DESCRIPTION OF THE INVENTION

Figure 1:
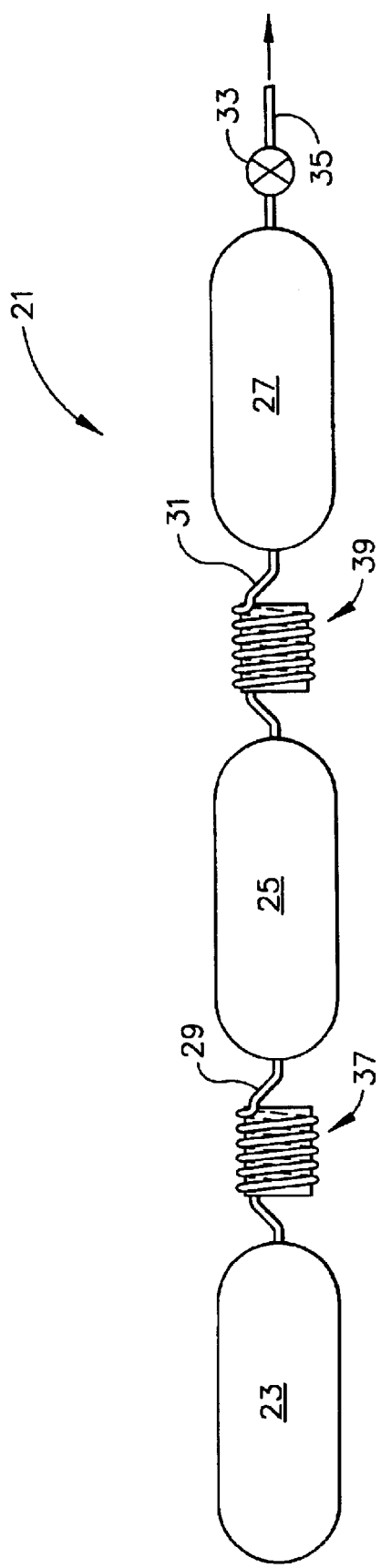
FIG. 1 is a schematic drawing showing a warming apparatus of the present invention having three vessels fluidly communicating in series.

As schematically shown in FIG. 1, gas warming system 21 is a preferred embodiment of the present invention. System 21 includes vessels 23, 25 and 27. Vessel 23 fluidly communicates with vessel 25 through line 29, and vessel 25 fluidly communicates with vessel 27 through line 31. There is no valve or other restriction on the fluid communication between vessels 23 and 25, or between vessels 25 and 27. Vessel 27 fluidly communicates with a combustor (not shown) through exhaust valve 33 and discharge line 35.

System 21 also includes heat exchangers 37 and 39. Line 29 is located in a heat conducting relationship with heat exchanger 37 so that heat from heat exchanger 37 can be conducted to the cooler gas flowing through line 29. Line 31 is located in a heat conducting relationship with heat exchanger 39 to enable heat from heat exchanger 39 to be conducted to the cooler gas flowing through line 31.

In operation, an oxydizer such as air, oxygen, or a mixture of air and oxygen is stored under pressure in vessels 23, 25 and 27. When emergency electrical and hydraulic power is needed, exhaust valve 33 is opened and the stored gas flows towards the lower pressure of discharge line 35 and the combustor, where it is mixed with fuel and burned. The expanding gases from this combustion turn a turbine wheel (not shown) which, in turn, powers an electrical generator or alternator, and a hydraulic pump.

When exhaust valve 33 is opened, the gas stored in vessel 27, comprising one third of the gas contained within system 21, will begin flowing through exhaust valve 33 and discharge line 35. The gas in vessel 25 will flow through line 31 and, after being warmed by heat exchanger 39, into vessel 27, where it will mix with the gas remaining therein. The gas in vessel 23 will flow through line 29 and, after being warmed by heat exchanger 37, into vessel 25, where it will mix with the gas remaining therein.

While gas is being vented from vessel 27, the temperature of the gas remaining in vessel 27 will increase, or at least decrease more slowly than it otherwise would, due to being mixed with gas originating from vessel 25 which has been warmed by heat exchanger 39. Similarly, the temperature of the gas in vessel 25 will increase, or decrease more slowly, because it will be mixed with gas originating from vessel 23 which has been warmed by heat exchanger 37.

The temperature of the gas flowing into the combustor will initially be the same low temperature that would be observed had one large vessel had been used without the benefit of warming system 21 of the present invention, and then become increasingly warmer in comparison to gas emanating from one large vessel. This is because of the heat energy added to the gas by heat exchangers 37 and 39.

Since none the gas inside vessel 23 is warmed by heat exchangers prior to it being expelled, vessel 23 has an expulsion efficiency no better than that of the one large vessel of the prior art. The expulsion efficiencies of vessels 25 and 27 of warming system 21 are higher than would be the case for one large vessel. As the volume of gas contained by vessel 23 is only one third of the total volume contained by warming system 21, the expulsion efficiency of warming system 21 is greater than that of a singular vessel of the prior art containing the combined volume of the communicating vessels of warming system 21.

The number of vessels in warming system 21 is a variable, with the minimum number being two. The number of heat exchangers is equal to the number of vessels minus one. For a given heat exchanger sizing, the overall expulsion efficiency of system 21 will increase with the number of vessels because the volume of gas exposed to heat conduction from heat exchangers will increase in proportion to the number of vessels. Stated alternatively, the volume of the singular vessel containing gas that will not be exposed to a heat exchangers decreases as the number of vessels increases.

Moreover, the overall expulsion efficiency of the system can also be increased by optimally sizing the relative volumes of the vessels as a function of the system's thermal properties and the rate of gas flow through exhaust valve 33.

Figure 2:
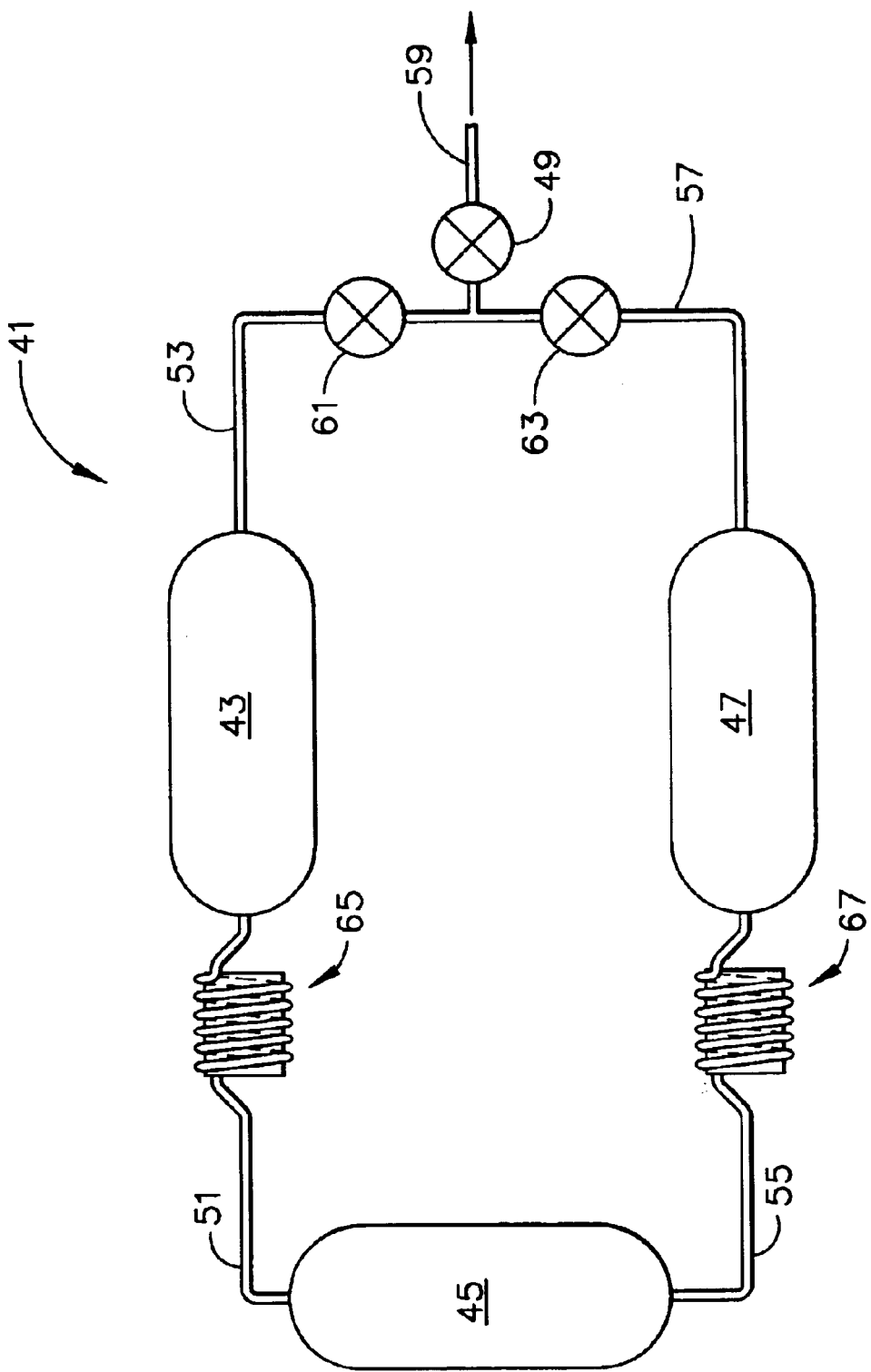
FIG. 2 is a schematic drawing showing a second warming apparatus of the present invention having three vessels communicating in a loop configuration.

As schematically shown in FIG. 2, gas warming system 41 comprises a second preferred embodiment of the present invention, and includes storage vessels 43, 45 and 47, and exhaust valve 49. Vessel 43 fluidly communicates with vessel 45 through line 51, and with exhaust valve 49 through line 53. Vessel 47 fluidly communicates with vessel 45 through line 55, and with exhaust valve 49 through line 57. Exhaust valve 49 fluidly communicates with a combustor (not shown) through discharge line 59.

There is no valve or other restriction on the fluid communication between vessels 43 and 45, and between vessels 45 and 47. However, solenoid-controlled shutoff valve 61 is located in line 53 and relief valve 63 is located in line 57.

System 41 also includes heat exchangers 65 and 67. Line 51 is located in a heat conducting relationship with heat exchanger 65 to enable heat from heat exchanger 65 to be conducted to the cooler gas flowing through line 51. Line 55 is located in a heat conducting relationship with heat exchanger 67 so that heat from heat exchanger 67 can be conducted to the cooler gas flowing through line 55.

When exhaust valve 49 is opened, the pressurized gas contained within system 41 is vented to the combustor. The flow control devices, shutoff valve 61 and relief valve 63, operate in concert to allow the gas to alternately flow out of vessels 47 and 43. More particularly, the crack pressure of relief valve 63 is set slightly higher than the pressure drop across relief valve 63 when exhaust valve 49 and shutoff valve 61 are both open. Relief valve 63 thus remains closed when shutoff valve 61 is open.

The gas flows clockwise in this configuration, as viewed from FIG. 2. Gas escapes from vessel 43 and flows through shutoff valve 61, exhaust valve 49, and discharge line 59. Gas from vessel 45 is warmed by heat exchanger 65 and flows into vessel 43. Gas from vessel 47 is warmed by heat exchanger 67 and flows into vessel 45 and on into vessel 43. After a brief interval, shutoff valve 61 is closed, causing the pressure downstream of relief valve 63 to drop and, concomitantly, the differential pressure across relief valve 63 to increase and exceed the crack pressure and open the valve. The flow of gas in system 41 then begins to circulate in a counterclockwise direction.

Thus, as shutoff valve 61 is alternatively opened and closed, the flow of gas in system 41 alternates direction between clockwise and counterclockwise, respectively. Each time the direction is changed, gas is heated by conduction from heat exchangers 65 and 67. In this manner, heated gas is more evenly distributed throughout the system, thus increasing the expulsion efficiency of each of vessels 43, 45 and 47.

System 41 does not have a vessel upstream of exhaust valve 49 that will suffer a low expulsion efficiency due to none of the gas contained therein being warmed, in contradistinction to the farthest upstream vessel 23 of system 21 in the first embodiment. As a result, system 41 may have a higher overall expulsion efficiency than system 21.

The number of vessels in system 41 can vary, with the minimum number being two. The number of heat exchangers is equal to the number of vessels minus one.

Relief valve 63 could be replaced by a second solenoid-controlled shutoff valve. The foregoing solenoid-controlled shutoff valve would be kept closed when shutoff valve 61 was open, and would be kept open when shutoff valve 61 was closed. Another alternative embodiment includes replacing exhaust valve 49, shutoff valve 61, and relief valve 63 with a single three-way valve communicating with discharge line 59. Though slightly more complex than using relief valve 63, the forgoing alternatives would more precisely control the fluid flow in system 41 and eliminate any downstream pressure perturbations in discharge line 59. Otherwise, system 41 would operate in the same way and to the same effect as previously described in conjunction with the use of relief valve 63.

Figure 3:
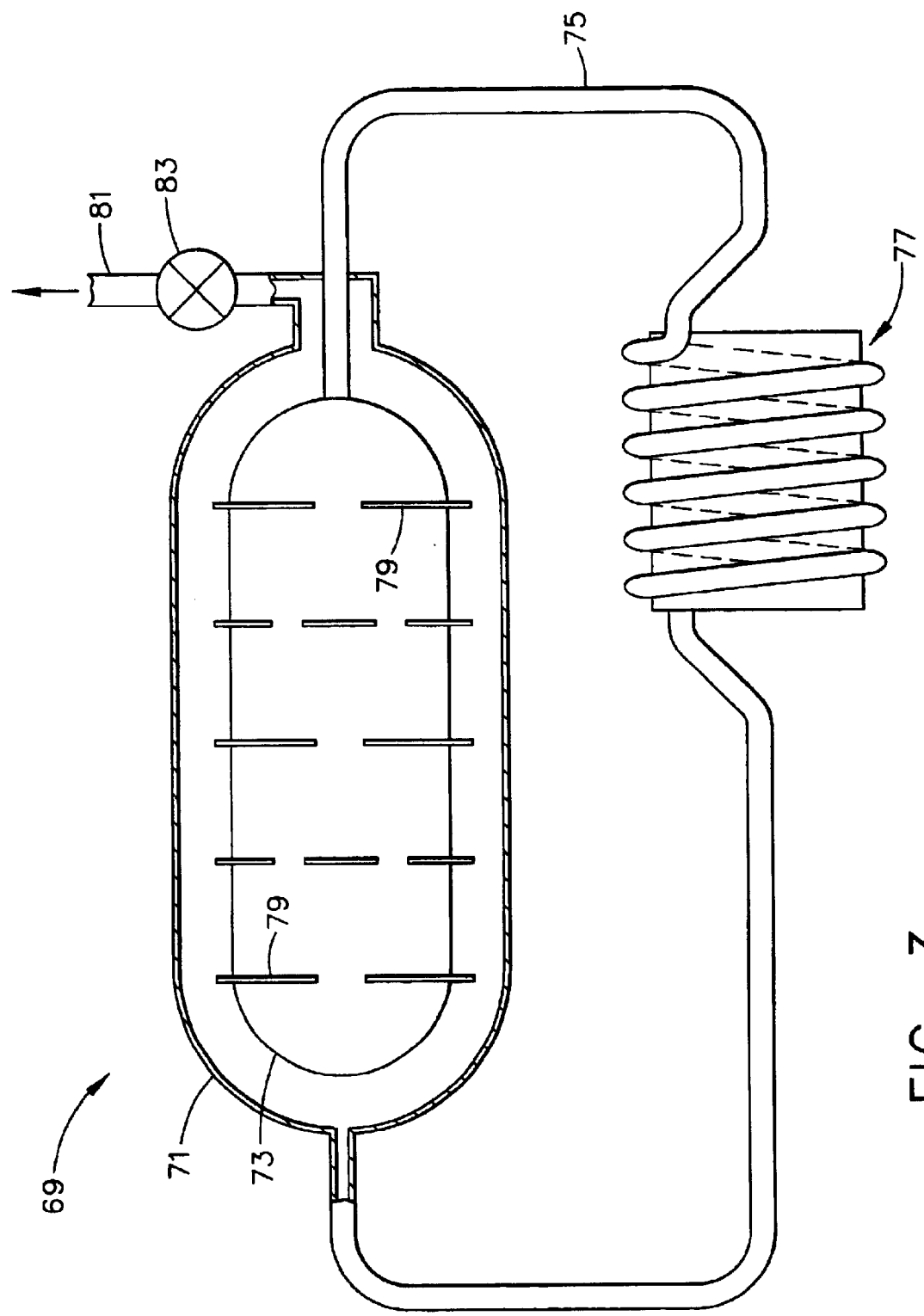
FIG. 3 is a schematic drawing showing a third warming apparatus of the present invention having an upstream vessel fluidly communicating with and being located inside of a downstream vessel.

As schematically shown in FIG. 3, gas warming system 69 comprises a third preferred embodiment of the present invention, and includes pressurized outer vessel 71 enclosing pressurized inner vessel 73. The two vessels fluidly communicate without restriction through line 75. Heat exchanger 77 is located in a heat conducting relationship with line 75 to enable heat from heat exchanger 77 to be conducted to the cooler gas flowing through line 75.

Heat transfer fins 79 are located inside vessel 73 and are also exposed to the gas in vessel 71 such that heat can be conducted from the gas in vessel 71 to the gas contained by vessel 73. Vessel 71 fluidly communicates with a combustor (not shown) through line discharge line 81. Exhaust valve 83 controls the flow through discharge line 81.

In operation, exhaust valve 83 is opened to allow pressurized gas to flow from system 69. As gas is vented to the combustor, gas is drawn from inner vessel 73 into outer vessel 71. The gas from inner vessel 73 is heated as it passes adjacent to heat exchanger 77, and thus warms the remaining gas contained in outer vessel 71 as mixing occurs. This heating of the gas within outer vessel 71 increases its expulsion efficiency.

Some of the heat of the gas in outer vessel 71 is conducted by fins 79 to the cooler gas remaining in inner vessel 73. This heat conduction increases the expulsion efficiency of inner vessel 73. The use of heat transfer fins 79 in conjunction with the concentric vessel configuration of system 69 serves to increase the expulsion efficiency of the upstream vessel in comparison to that of the vessel farthest upstream in system 21, i.e., vessel 23, thereby improving the overall expulsion efficiency of system 69 over that of a system 21 having two vessels.

In addition to realizing the benefits attendant to increasing the expulsion efficiency of the storage system, the warmer gas temperature obtained by a warming system of the present invention reduces the contraction of the components used in the exhaust valve, decreases the probability of ice forming in the exhaust flow, improves the flexibility of various elastomeric seals, and enhances the volatility of the fuel in the combustor. The warming system of the present invention achieves the foregoing without introducing the hazard associated with storing an incendiary device on board an aircraft, and without forming and interpolating particulate matter into the system.

It should be understood, of course, that the foregoing relates to preferred embodiments of the invention and that modifications may be made without departing from the spirit and scope of the invention as set forth in the following claims.

We claim:

1. An apparatus for warming a pressurized gas, comprising:
   a plurality of vessels for storing a gas wherein said plurality of vessels is comprised of a first vessel and an exhaust vessel, and wherein said first vessel is located inside of said exhaust vessel;
   an exhaust valve for exhausting the pressurized gas from the apparatus;
   a combustor fluidly communicating with said exhaust valve;
   heat conduction means exposed to the gas in said first vessel and the gas in said exhaust vessel, said heat conduction means for conducting heat from said exhaust vessel to said first vessel;
   communication means for fluidly communicating said vessels with each other and with said exhaust valve; and
   a heat exchanger for heating the gas flowing through said communication means, the heat exchanger being positioned outside of the exhaust vessel.

2. The gas warming apparatus as defined in claim 1 wherein:
   said apparatus is capable of storing the gas at a system pressure;
   a downstream pressure fluidly communicating with said exhaust valve; and
   said system pressure is greater than the downstream pressure.

3. The gas warming apparatus as defined in claim 1 wherein:
   said communication means is comprised of a line communicating said first vessel with said exhaust vessel; and
   said exhaust valve communicates with said exhaust vessel.

4. The gas warming apparatus as defined in claim 1 wherein:
   said heat conduction means is comprised of a fin.

5. The gas warming apparatus as defined in claim 1 further comprising:
   a tank for storing fuel; and
   the tank fluidly communicating with the combustor, whereby
   the gas is mixed with the fuel in the combustor.

6. A method for warming pressurized gas comprising:
   storing a gas under a system pressure in a closed system comprised of a plurality of fluidly communicating vessels;
   wherein said vessels are comprised of a first vessel and a second vessel, said first vessel being situated within said second vessel;
   conducting heat from the gas within said second vessel to the gas within said first vessel by inserting heat conduction means into said system so that said heat conduction means are exposed to the gas within said first vessel and the gas within said second vessel;
   forcing the gas to flow from said first vessel to said second vessel by exhausting the gas from the system to a downstream pressure lower than said system pressure and feeding the exhausted gas to a combustor; and
   heating the gas in a heat exchanger as said gas flows from said first vessel to said second vessel, the heat exchanger being positioned outside of the second vessel.

7. The gas warming method as recited in claim 6 further comprising mixing the exhausted gas with fuel in a combustor.

8. The gas warming method as recited in claim 6 further comprising forcing the gas to flow from said first vessel into said second vessel before exhausting the gas from the system.

9. The gas warming method as recited in claim 6 wherein said heat conduction means comprise heat transfer fins.

10. A method for delivering a gaseous oxidant under pressure to a combustor from a system closed off from the combustor comprising:

conducting heat from the gaseous oxidant within a first vessel to the gaseous oxidant within a second vessel by inserting heat conduction means into said second vessel so that said heat conduction means are exposed to the gaseous oxidant within said first vessel and the gaseous oxidant within said second vessel;

opening an exhaust valve to open said system and allowing the gaseous oxidant contained under pressure in said first vessel to flow from said first vessel through said exhaust valve to a combustor and allowing a gaseous oxidant contained under pressure in said second vessel to flow from said second vessel through a line to said first vessel wherein said second vessel is situated within said first vessel; and heating said gaseous oxidant flowing in said line from said second vessel to said first vessel for increasing a temperature of gaseous oxidant flowing in said line.

11. The method as recited in claim 10 wherein said heat conduction means comprises heat transfer fins.

12. The method as recited in claim 10 wherein said gaseous oxidant is selected from the group consisting of oxygen, air enriched with oxygen, and air.

13. The method as recited in claim 10 wherein said gaseous oxidant passes through said exhaust valve to a lesser pressure.

\* \* \* \* \*